US009643823B2

(12) United States Patent
Hall

(10) Patent No.: US 9,643,823 B2
(45) Date of Patent: May 9, 2017

(54) SPORT UTILITY VEHICLE MOBILE HARD TOP REMOVAL, STORE, AND INSTALL DEVICE

(71) Applicant: Fredrick Hall, Spring Hill, FL (US)

(72) Inventor: Fredrick Hall, Spring Hill, FL (US)

( * ) Notice: Subject to any disclaimer, the term of this patent is extended or adjusted under 35 U.S.C. 154(b) by 0 days.

(21) Appl. No.: 15/005,013

(22) Filed: Jan. 25, 2016

(65) Prior Publication Data

US 2016/0257535 A1 Sep. 8, 2016

Related U.S. Application Data

(60) Provisional application No. 62/108,094, filed on Jan. 27, 2015.

(51) Int. Cl.
*B62B 1/00* (2006.01)
*B66C 23/48* (2006.01)

(52) U.S. Cl.
CPC .................................... *B66C 23/48* (2013.01)

(58) Field of Classification Search
CPC ...... B66C 23/48; F16M 11/046; F16M 11/10; F16M 11/18
USPC ............... 248/124.1; 414/592; 296/102, 103; 280/79.11, 79.3
See application file for complete search history.

(56) References Cited

U.S. PATENT DOCUMENTS

| | | | | |
|---|---|---|---|---|
| 4,867,465 | A * | 9/1989 | Dunchock | B62B 3/108 280/79.3 |
| 6,309,007 | B1 * | 10/2001 | Essig | B60J 7/106 296/102 |
| 7,172,204 | B1 * | 2/2007 | Tierney | A47B 81/00 280/79.11 |
| 2016/0137468 | A1 * | 5/2016 | Walker | B66C 23/48 187/235 |

* cited by examiner

*Primary Examiner* — Todd M Epps
(74) *Attorney, Agent, or Firm* — Justin Luby

(57) ABSTRACT

A device designed for the removal, storage, and installation of convertible hardtops from sport utility vehicles. The device is floor level and mounted on casters for portability. The device utilizes a platform and ratcheted gear apparatus to assist provide leverage and assist a single operator to remove or install a convertible hardtop form an SUV. The device also utilizes a tilting assembly to allow the operator to reduce the footprint of the device with the hardtop loaded, making it simpler to maneuver and store.

7 Claims, 15 Drawing Sheets

SPORT UTILITY VEHICLE MOBILE HARD TOP REMOVAL, STORE, AND INSTALL DEVICE

CROSS-REFERENCE TO RELATED APPLICATIONS

This application claims priority to provisional application U.S. Ser. No. 62/108,094 filed Jan. 27, 2015. Said application is incorporated by reference herein in its entirety.

FIELD OF THE INVENTION

This invention generally relates to automobile accessories and more specifically those used for lifting, storage and installation of removable hardtop(s) from an automobile.

BACKGROUND

Convertible two door and four door sport utility vehicles (SUVs) have become an increasingly popular vehicle. Typically these vehicles are sold with collapsible soft tops standard on these vehicles. For many individuals, these convertible soft tops do not provide adequate weather or noise insulation. Additionally, it can be a rather arduous task to collapse and erect the soft tops on the vehicle, particularly on the 4-door vehicles.

Various types of removable hard tops have been made available and configured to replace the standard collapsible soft tops for the different convertible SUVs. These convertible hard tops provide significantly better weather and noise insulation than their soft top counterparts. However, in order to enjoy the convertible feature of the SUVs it is often desirable to remove the hard top.

A SUV removable hard top is typically configured to be easily attachable and detachable to the SUV. Typical SUV removable hard tops are relatively heavy, bulky, and awkward to handle. The size and weight present a significant problem for removal and installation, especially by one person working alone. Typically, a group of at least two people is required to remove or install SUV removable hard tops. In order to further share the weight load, a group of four people is preferable to lift and remove or install a removable hardtop, with each person handling or lifting each corner of the hardtop in concert with others in the group.

In order to simplify the process of installing and removing hardtops from the convertible SUVs, many owners will utilize specialized overhead lifts that are installed in their garages to perform this function. When utilizing these overhead lifts, owners will position their vehicle below the stationary lifts, and then connect the hardtop to the overhead lift, release the hardtop from the SUV, lift the hardtop above the SUV, and then drive the vehicle from underneath the lift and detached hardtop. Similarly, when installing the hardtop the vehicle will be positioned under the lift and hardtop, which will be then lowered onto the SUV.

While these lifts are an effective method of removing and installing convertible hardtops on an SUV, they can provide logistical issues. First and foremost, utilization of a lift as described above requires the owner of the vehicle to have a garage or other support structure available to install the hoist system onto. Not all owners of these types of vehicles have these facilities available to them. Additionally, these types of lifts are fixed and not portable. Therefore they may not be suitable for owners of these types of vehicles who may rent or who want to have the ability to remove the top from their vehicle at locations other than their home, such as when they are on vacation or a camping trip. Finally, most of these fixed position lift devices do not allow for parking vehicle in the garage while hard top is affixed to the device.

Thus, there exists a need for a freestanding apparatus which is capable of installing and removing a hardtop from a convertible SUV. It is also important that this apparatus be able to compactly store the hardtop while it is removed from the vehicle. Finally, it is important that this apparatus allow a single operator to perform the functions of installing, storing, and removing a removing a hardtop from a convertible SUV.

SUMMARY

It is the object of the present invention to provide an apparatus which allows a single operator to install and remove a hardtop from a convertible SUV.

Another object of the present invention is to provide an apparatus which is capable of removing a hardtop from a convertible SUV which is freestanding so that the apparatus does not need to be mounted to a load bearing member of a structure.

Still another object of the present invention is to provide an apparatus which is capable of storing a hardtop from a convertible SUV when it has been removed from the SUV.

A further object of the present invention is to provide an apparatus that will allow for the SUV vehicle to be stored in a garage or other structure along with the hardtop while it is attached to the apparatus.

Yet a further object of the present invention is to provide an apparatus which is capable of removing a hardtop from a convertible SUV which can be disassembled and reassembled so that it can be easily transported between locations.

The SUV mobile hard top removal, storage and installation device of the present invention is comprised of a pair of extendable vertical support legs that can be adjusted vertically. Attached to the bottom of the vertical support legs is a base unit with casters which extends from the vertical support legs towards the SUV. Attached to the top of the vertical support legs via hinged connection is a platform lifting system which is comprised of a lever, ratcheting system, and platform assembly.

When the unit is operated to remove a hard top, the unit is manually maneuvered by the operator into position between vehicle rear wheels and underside of vehicle. The unit is maneuvered so that the platform assembly is aligned and connected to the hardtop. The hardtop can be lifted from vehicle by means of depressing with downward force onto lever providing counter force lifting platform assembly and hardtop. The ratcheting gear assembly supports the lifting platform assembly and hardtop keeping it raised while the operator is not applying force to the lever. Once the platform lift and hardtop have been raised high enough that the hardtop is clear of the SUV, the unit with the hardtop attached is maneuvered away from the vehicle for storage while the SUV is enjoyed sans hardtop.

The unit also features an optional tilting mechanism which allows the hardtop unit to be stored on the assembly in the semi-vertical position instead of the horizontal position, saving valuable footprint area. The tilting mechanic is comprised of a hinged connection in the platform assembly that is normally affixed at a right angle between the top of the platform and the platform support utilizing a locking mechanism. The locking mechanism can be released utilizing a tilt lever. When the locking mechanism is released, the platform and hardtop will pivot and rotate clockwise toward the semi-vertical position until rotation of the unit is stopped by the rail rest.

The hardtop can also be simply reinstalled on the SUV utilizing this unit. From the tilted position the operator will lift the front of the hardtop until it reaches a horizontal position and the locking mechanism engages. The unit is then again re-aligned with the SUV so that the hardtop aligns with the SUV. Once aligned, the operator will release the ratcheting mechanism and the hardtop will be lowered back onto the SUV. Once the hardtop has been reconnected to the SUV, the platform and hardtop can be disconnected from each other, and the empty device can be rolled away from the SUV.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

DETAILED DESCRIPTION OF THE INVENTION AND PREFERRED EMBODIMENT

Figure 1:
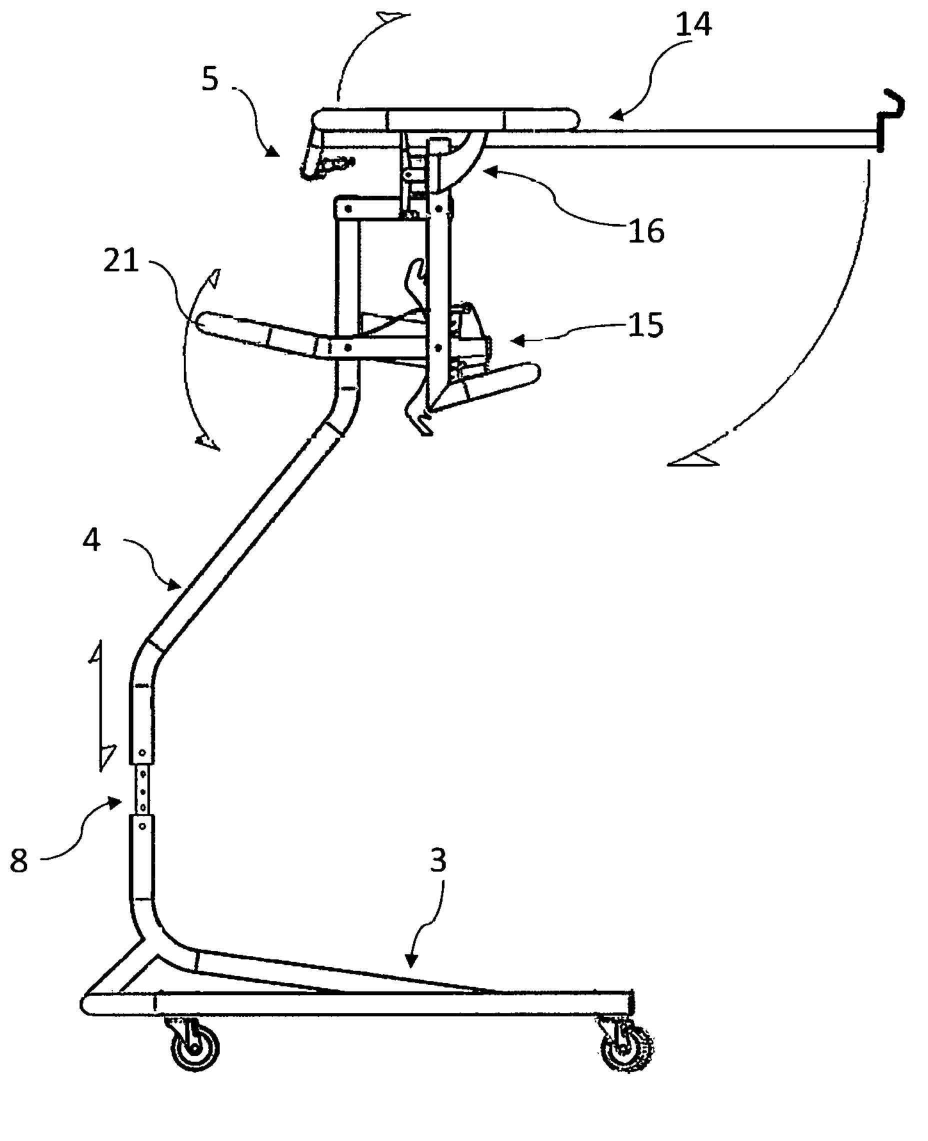
FIG. 1 is a side elevation view illustrating the SUV Mobil Hard Top Removal, Storage, and Installation Device of the current invention.

As shown in the drawings, the present invention provides an device designed for the removal, storage, and installation of removable hardtops 1 from convertible sport utility vehicles 2. As depicted in FIG. 1, in general the device comprises a wheeled base unit 3, a vertical support structure 4 and a platform assembly 5. The core components of the device are arranged such that the base unit 3 is aligned directly below the platform unit 5 and the vertical support structure 4 is connected to the rear of the base unit 3 and platform assembly 5 connecting the two together. The resulting structure is a "C" shaped unit, which is designed such that the weight and moment created when the hardtop unit 1 is loaded onto the platform assembly 5 its weight is counteracted and supported by the legs 6 of the base unit 3, preventing the device from toppling over.

Figure 8:
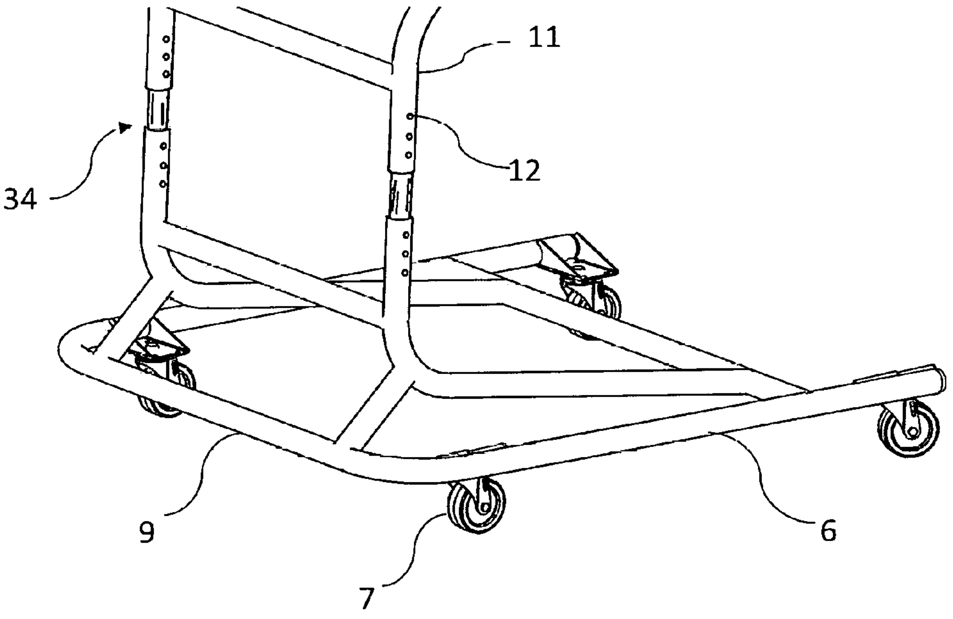
FIG. 8 is a perspective view illustrating the Base and the Castors.

Referring to FIG. 8, In the preferred embodiment the base unit 3 is comprised of a "U" shaped frame 9 with two legs 6 with four casters 3 affixed to the legs 6. The frame 9 of the base unit 3 connects to the vertical support 4 structure near the rear of the base frame 9. In the preferred embodiment the frame and the vertical support structure are tube in tube slide-over connections 8 with a plurality of aligning holes 12, through which pins can be inserted (not pictured) to allow for simple height adjustment, however, these two units could be affixed to each other in any manner known to those skilled in the art, such as brackets and welding.

The most critical design aspect of the base unit is that the horizontal distance between the end of the base legs 6 and the vertical support 4 be sufficient to prevent the unit from toppling over when the hardtop 1 is installed on the platform assembly 5. The ends of the base legs 6 should extend from the vertical support 4 to at least the horizontal location of center of mass of the unit, both with the hardtop installed and the hardtop removed and ideally a bit past the center of mass for added stability.

Additionally, the lateral distance between the two legs 6 needs to be sufficient to provide lateral support and prevent the unit from tipping over sideways, however, the distance cannot exceed the distance between the inner side of the tires of the SUV 10. Exceeding the distance between the inner sides of the tires 10 would prevent the legs 6 of the unit from being able to roll underneath SUV 2 so that the platform assembly 5 can align with the removable hardtop 1.

Referring to FIG. 8, attached to the underside of the legs 6 are four wheel and caster assemblies 7. These wheel and caster assemblies 7 allow the device to be aligned with the hard top 1 and roll away from the hardtop 1 once it has been detached from the SUV 2. In the preferred embodiment of the invention, the casters 7 are all free rotating, however, the casters 7 could be all fixed, a combination of fixed and free rotating casters 7, or any other arrangement known to those skilled in the art.

Referring to FIGS. 1 and 8, connecting the base unit 3 and the platform assembly 5 is a vertical support structure 4. The vertical support structure 4 comprises a single, or a plurality of vertical beams 11. In the preferred embodiment of the invention the vertical support structure 4 is variable in length to allow the device to be utilized with a variety of types of vehicles. In the preferred embodiment the variable height support beams 11 are hollow tube in tube structure 8 with a plurality of pin holes 12 and pins to allow for height adjustment. However, the inventor recognizes that height adjustment can be achieved through a number of methods known to those skilled in the art, such as, but not limited to, hydraulic or pneumatic cylinder and tube in tube structures with spring loaded push button retention pins.

Figure 2:
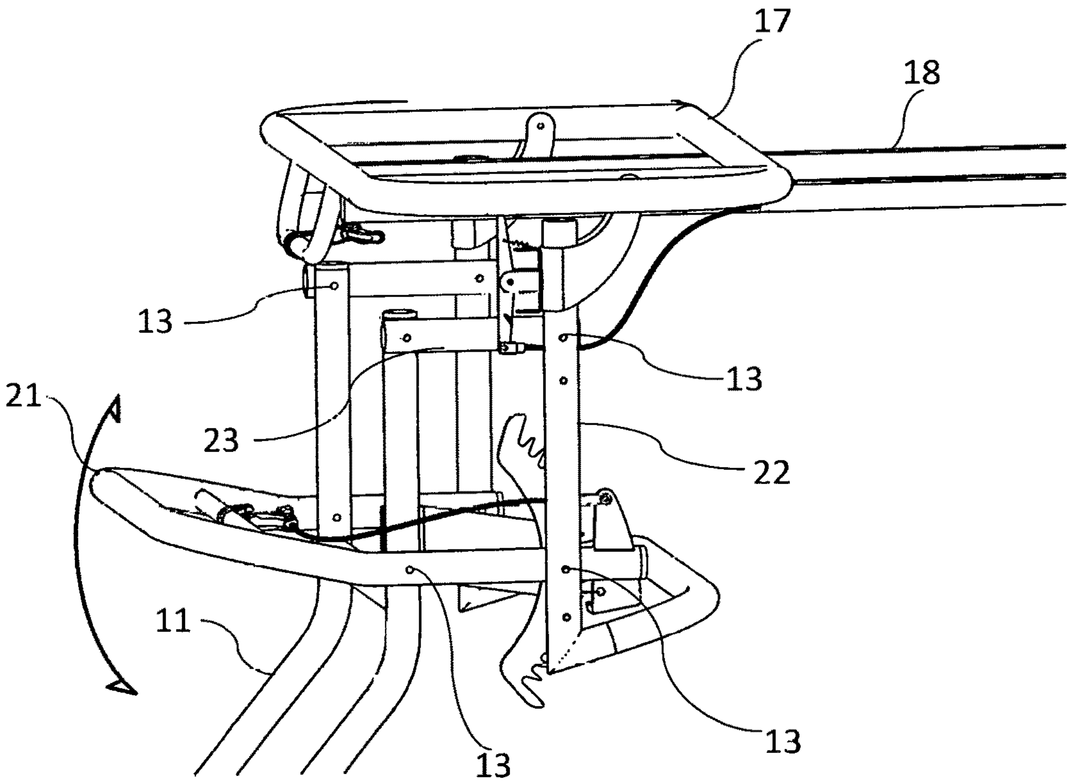
FIG. 2 is an enlarged perspective view illustrating the Platform Assembly.

Referring to FIGS. 1 & 2, attached to the top of the vertical support structure 4 is a platform assembly 5. The platform assembly 5 is affixed to the vertical support structure 4 via hinged connections 13. In the preferred embodiment of the invention there are two vertical support beams 11 with four hinged connections 13, two per support beams 11. While not critical to the operation of the invention, having two support beams 11 instead of a single support beam 11 helps prevent bending and binding at the hinged connections 13 as a result of unstable or unbalanced loads.

The hinged connections 13 used throughout the device in the preferred embodiment are achieved through pins or bolts running through holes that are drilled in the tube frame of the vertical support structure 4 and the platform assembly 5. However, the inventor recognizes that hinged connections 13 can be achieved through a number of methods known to those skilled in the art, such as, but not limited to, template hinges and pivot hinges.

Referring to FIG. 1, The platform assembly 5 is comprised of three primary components; hardtop interface platform 14, a ratcheting lift assembly 15, which provides a means for vertical lifting, and a tilting assembly 16. The hardtop interface platform 14 allows the device to attach to and support the removable hardtop 1. The ratcheting assembly 15 allows the operator easily lift and lower the hardtop 1. The tilting assembly 16 allows the operator to tilt the hardtop 1 when it is installed on the device, to reduce the footprint required for storage.

Figure 5:
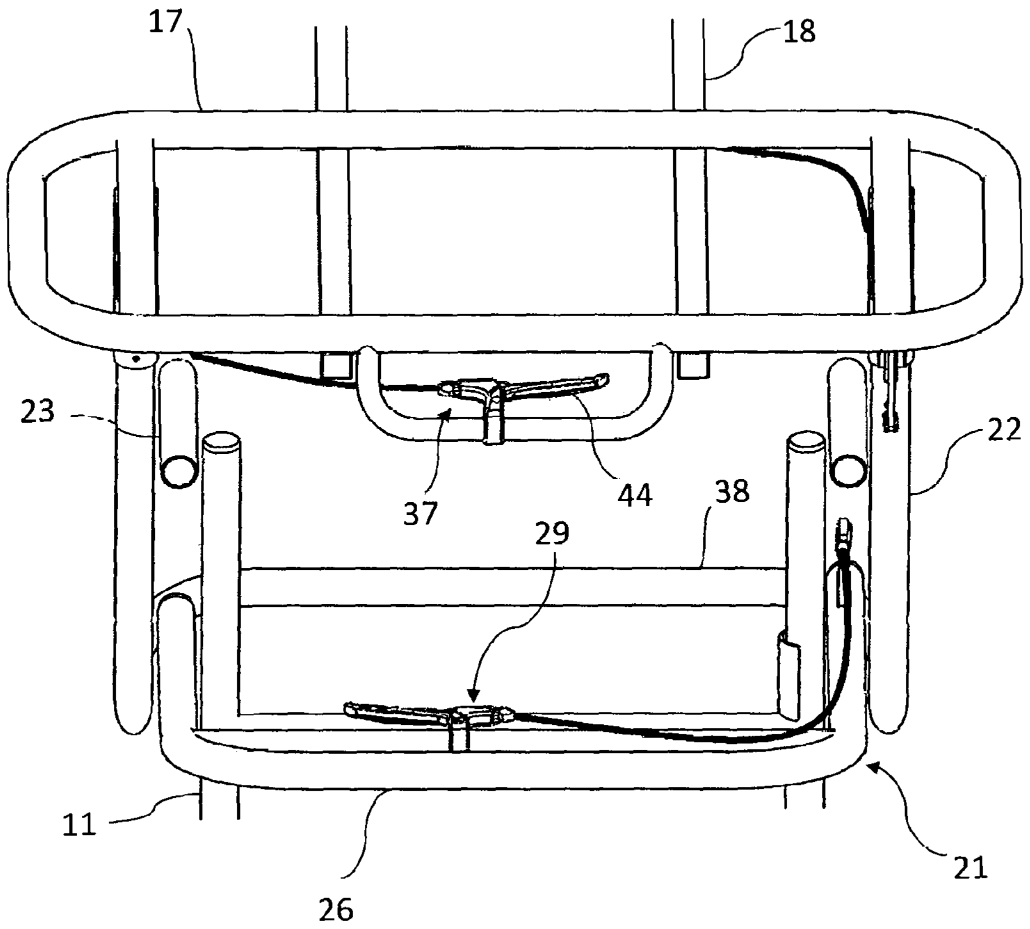
FIG. 5 is an enlarged top rear view illustrating the Platform Assembly Levers of the Tilting Platform Assembly.

Referring to FIGS. 2 & 5, the hardtop interface platform 14 is comprised of a SUV top platform 17, a single or plurality of removable grip rails 18, and a corresponding number of grip rail tube sleeves (not pictured). The in the preferred embodiment the SUV top platform 17 is a rectangular shaped structure that will interface with the hardtop during the installation and removal of the hardtop unit. The SUV top platform 17 should be of sufficient length and width that the hardtop 1 can be rested on the platform 17 as it is removed from or lowered onto the vehicle 2 without instability. While in the preferred embodiment the SUV top platform 17 is rectangular shaped, the platform 17 could be designed with any shape such as an oval or triangle, as long as it is of sufficient length and width that the hardtop 1 can be rested on the platform 17 as it is removed from or lowered onto the SUV 2 without instability.

In the preferred embodiment of the invention, attached to the SUV top platform 17, are two grip rail sleeves (not pictured), which is the optimal number the inventor believes that using two grip rails 18 maximizes stability while achieving cost efficiency. More or less than two grip rails 18 and associated grip rail sleeves could be utilized. These sleeves are hollow and the inner cross sectional segments of the sleeve provides a slightly larger representative profile of the cross-section of the outer surface of the grip rail 18 which is inserted into it. On one side of each of the grip rail tube a plurality of holes are drilled which will accommodate a push button locking mechanism (not pictured) which is located on each of the corresponding grip rails. The length of the grip rail tube sleeves must be long enough that the grip rails 18 are sufficiently supported as to ensure the grip rails 18 maintain alignment. While in the preferred embodiment of the invention there are two longer grip rail sleeves, the function of the grip rail sleeves could be sufficiently achieved using tour sleeves shorter in length, but sufficiently spaced apart to ensure the grip rails maintain alignment.

Referring to FIG. 2, inserted into the two grip rail tube sleeves are two grip rails 18. The grip rails 18 each are comprised of long tube members where the outer cross sectional segments of the grip rail 18 provides a smaller larger representative profile of the cross-section of the inner surface of the grip rail sleeve which it is inserted into. Internally, each grip rail has a push button clip locking mechanism which secures the grip rails in their intended location when the mechanism aligns with the corresponding holes drilled in the grip rail sleeves.

Figure 9:
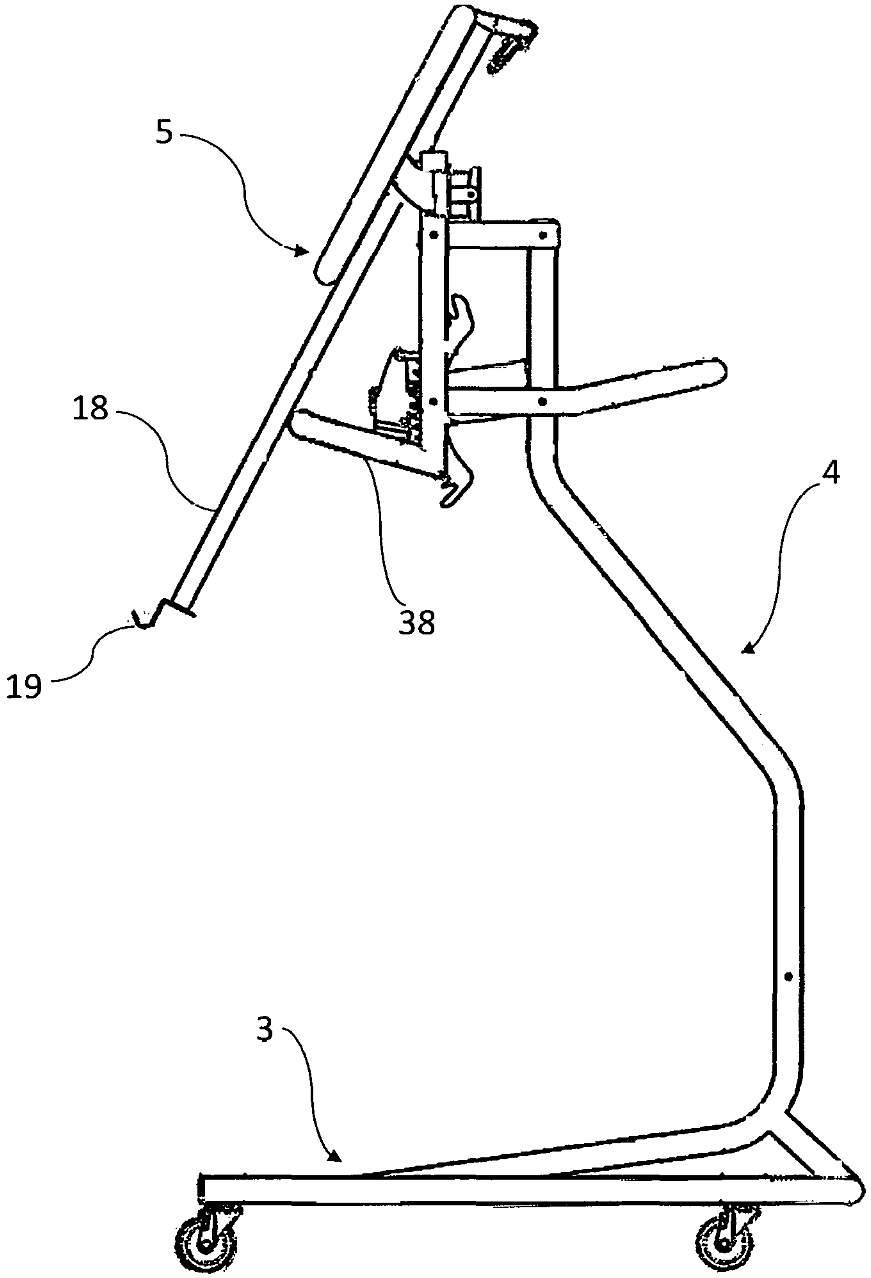
FIG. 9 illustrates a left side view illustrating rotation of the Platform Assembly when the tilting mechanism is operated.
Figure 10:
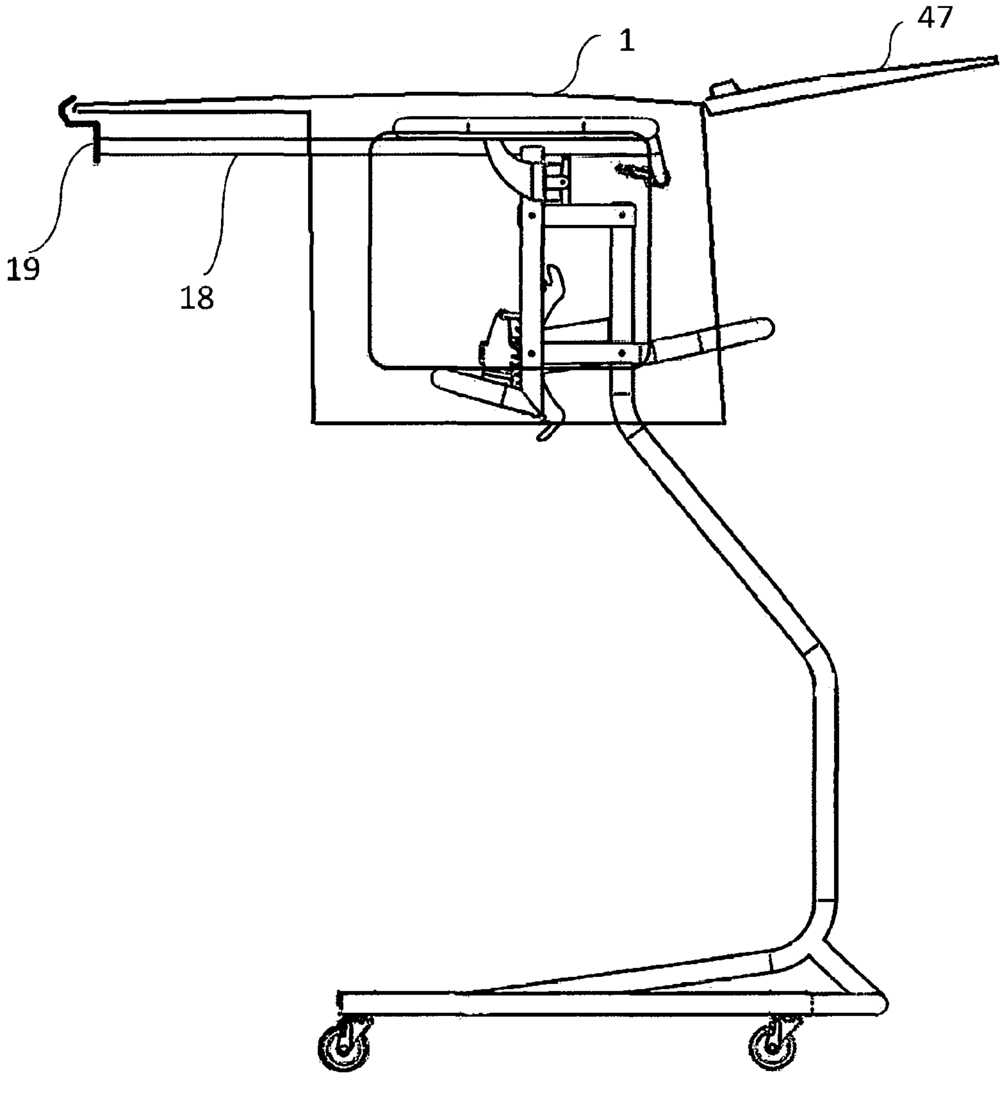
FIG. 10 is a left side view illustrating the hardtop in elevated position upon Platform Assembly for the hardtop storage apparatus.
Figure 11:
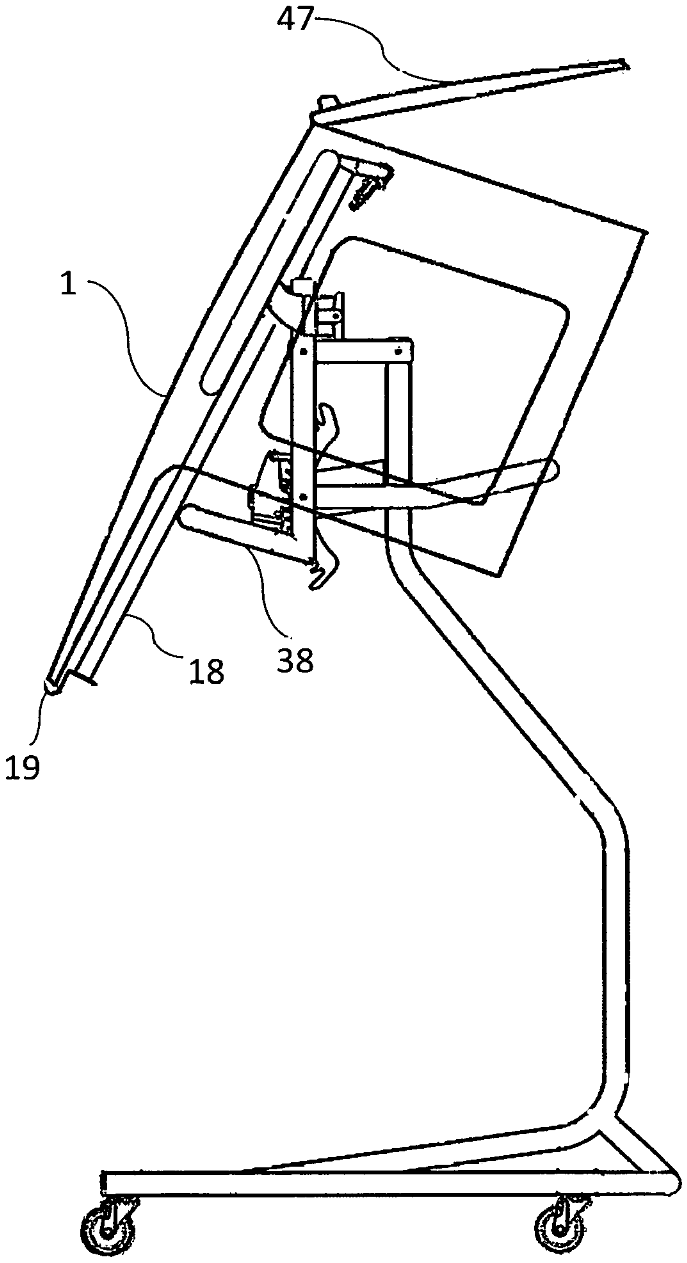
FIG. 11 is a left side view illustrating rotation of the Platform Assembly for the hardtop storage apparatus.

Referring to FIGS. 9, 10 & 11, at the end of each grip rail is a front edge grip 19. The front edge grips 19 are sized accordingly and in a manner where that grips 19 fit into the groove or notch 20 existing in the hardtop 1, retaining the hardtop 1 firmly in place with respect to the removal device, while the wheeled install/removal device can moved about. In the preferred embodiment, each grip 19 has an optional protective coating or cover which prevents the grips from scratching the hardtop.

Figure 3:
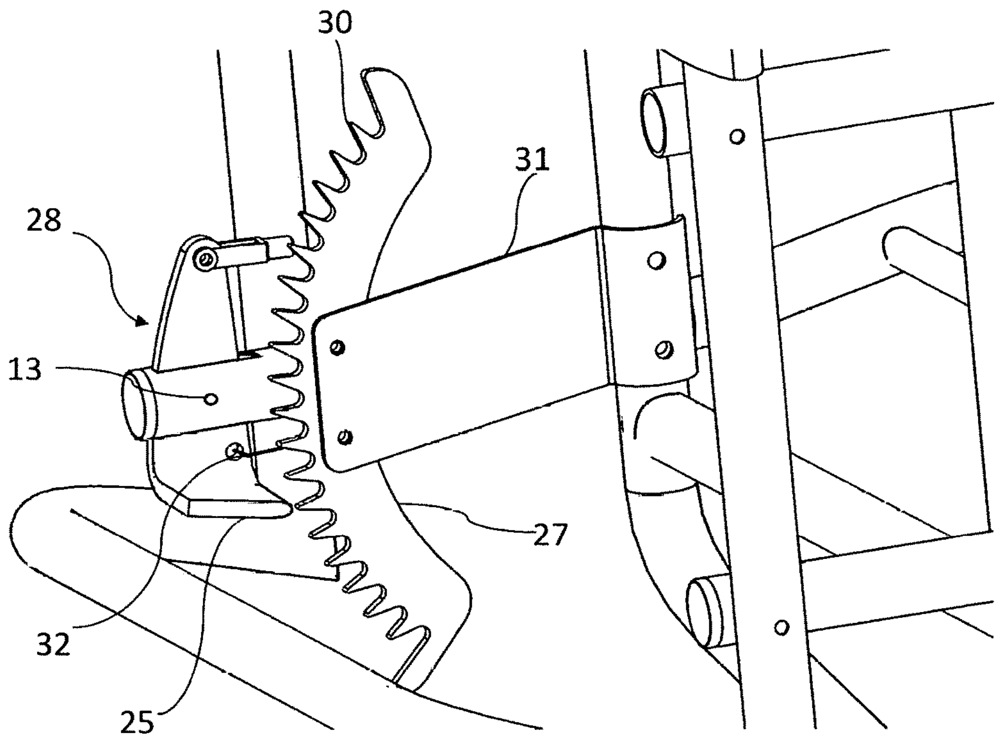
FIG. 3 is an enlarged perspective view illustrating the Pawl and Gear Assembly section of the Tilting Platform Assembly.
Figure 4:
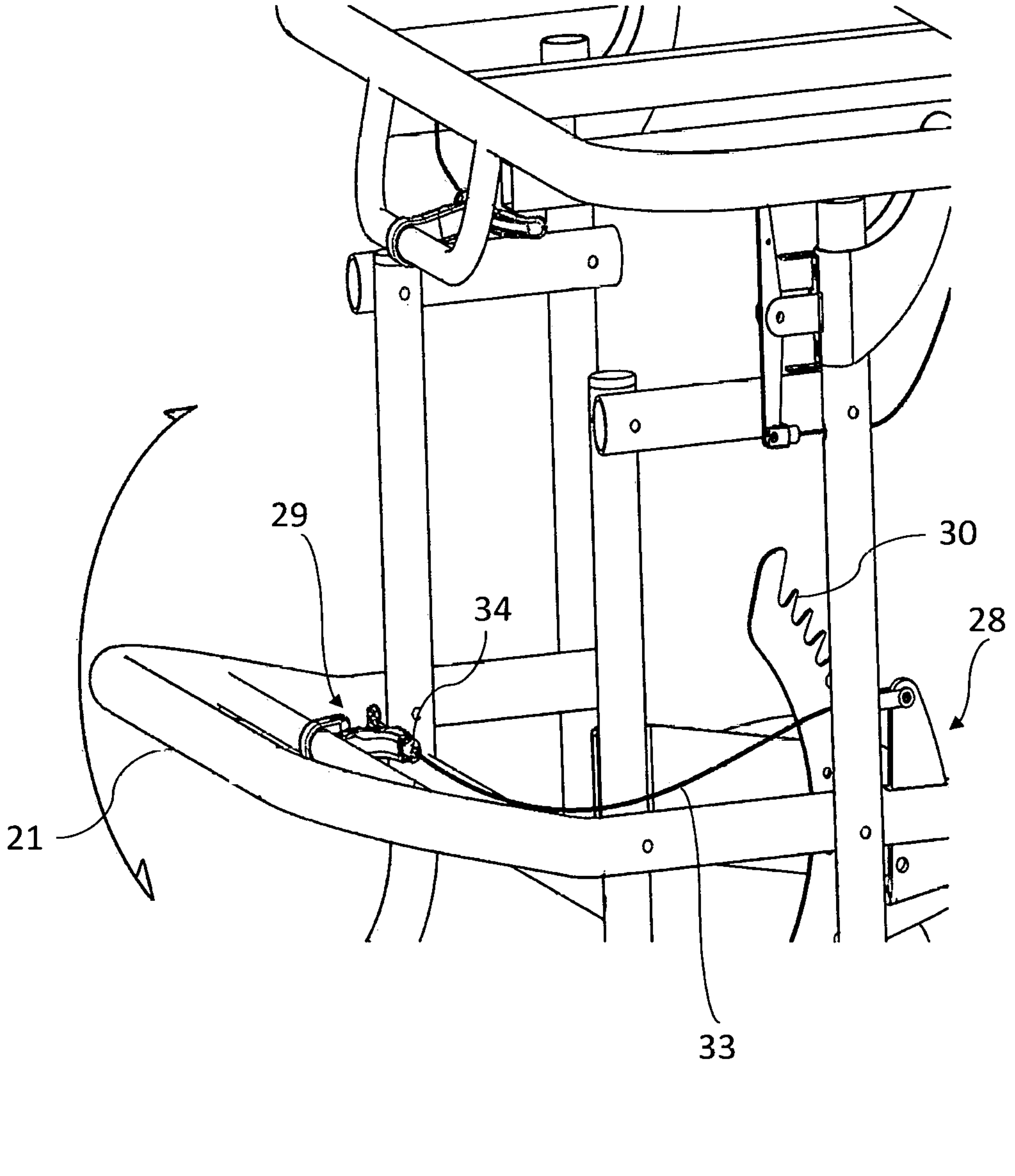
FIG. 4 is an enlarged rear view illustrating the Platform Assembly and Levers of the Tilting Platform Assembly.

Referring to FIGS. 3, 4, & 5 the ratcheting lift assembly 15 is primarily comprised of the following components; a lift lever 21, vertical platform push rods 22, horizontal lift support members 23, a ratcheting mechanism 24, and a release mechanism 29.

Referring to FIG. 5, in the preferred embodiment the lift lever 21 is a U-shaped hollow frame tube that is connected to the vertical support beams 11 in two parallel locations via pinned hinged connections 13 and is also connected to the two vertical platform push rods 22 via parallel pinned hinged connections 13 as well. The U-shaped bar 21 is oriented such that the straight section 26 of the U is oriented towards the operator while the lift is in use. The straight section 26 provides the operator with a handle which he can exert a downward force which will push the vertical platform push rods 22 upward, lifting the hardtop 1 from the vehicle. The further the distance between the handle 26 and the hinged connections 13 to the vertical support beams 11 the more leverage the operator will have to lift the hardtop 1 from the vehicle 2, requiring the operator to exert less energy to remove the top 1.

Referring to FIG. 2, the vertical platform push rods 22 are hollow frame tubes that are connected to the lift lever 21 via pinned hinged connections 13, connected to the to the horizontal lift support beams 11 via pinned hinge connections 13, and is fixedly attached to the tilting assembly 16. The hollow frame tubes have a plurality of holes drilled in them (not pictured) to allow for height adjustment via changing the locations of the pinned hinge connections. The vertical platform push rods 22 function to transfer the force generated by the operator when he/she pushes downward on the handle to the platform assembly 5 and hardtop 1 and move upward to detach the hardtop 1 from the vehicle 2. Having the vertical push rods 22 attached to the vertical support beams 11 in two locations, via the lever 21 and the horizontal lift support members 23, ensures that the vertical push rods 22 maintain a perpendicular orientation to the ground while moving up and down.

Referring to FIG. 2, the horizontal lift support members 23 are hollow frame tubes that are connected to the vertical support beams 11 via pinned hinged connections 13 and to the vertical platform push rods 22 via pinned hinge connections 13. The horizontal lift support members 23 function to provide a second attachment point for the vertical platform push rods 22 to the vertical support beams 11 which ensures that the vertical push rods 22 maintain a perpendicular orientation to the ground while moving up and down.

Referring to FIG. 3, the ratcheting mechanism 24 is primarily comprised of; a lift gear 27, a pawl 28, and a release mechanism 29. The lift gear 27 is a semi-circular shaped gear with a plurality of teeth 30. The radius of the lift gear 27 should be the same or similar radius as the arc the device makes when it is raised and lowered to ensure the pawl 28 and lift gear 27 remain engaged. The lift gear 27 is fixedly attached to the one of the vertical support beam 11 and protrudes from away from the operator via a bracket 31.

The pawl 28 is a spring loaded finger that is attached to the lift lever 21 via a hinged connection 13 and has a spring 32 that connects and compresses the pawl 28 and the gear 27 together. The spring 32 is attached to the lower half of the pawl 28, below the hinged connection 13. The finger device on the pawl 28 is downward sloping and contoured to fit the teeth 30 of the gear 27. When the operator pushes down on the handle the vertical platform push rods 22 move in the unrestricted (i.e., upward) direction, and the pawl 28 easily slides up and over the similarly sloped edges of the teeth 30, with a spring 32 forcing it (often with an audible 'click') into the depression between the teeth 30 as it passes the tip of each tooth. When the operator stops pressing downward on the handle 21 the weight of the hardtop 1 attempts to move the vertical platform push rods 22 in the opposite (downward) direction, however, the pawl 28 will bind against the oppositely sloped edge first tooth it encounters, thereby locking it against the tooth and preventing any further motion in that direction.

Referring to FIG. 4, the release mechanism 29 comprises a cable 33 that is attached to the top part of the pawl 28 above the hinged connection 13. The other part of the cable 33 is attached to a tensioning mechanism 34 located on the lift lever. When the tensioning mechanism 34 is engaged by the operator, the cable 33 tightens, and disengages the pawl 28 from the gear teeth 30. Once the pawl 28 has been disengaged the vertical platform push rods 22 can move freely in the downward direction. In the preferred embodiment of the invention the release mechanism 29 is achieved using a bicycle style brake lever, however, this could be achieved through any method known to those skilled in the art.

Figure 6:
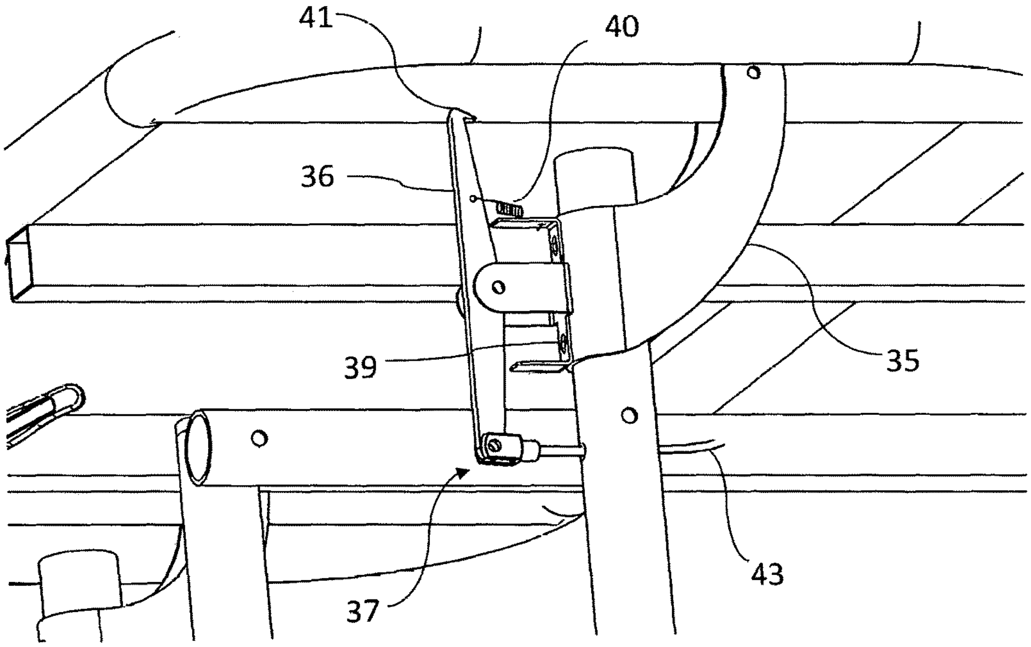
FIG. 6 is an enlarged view illustrating the Platform Release Mechanism on of the Tilting Platform Assembly.
Figure 7:
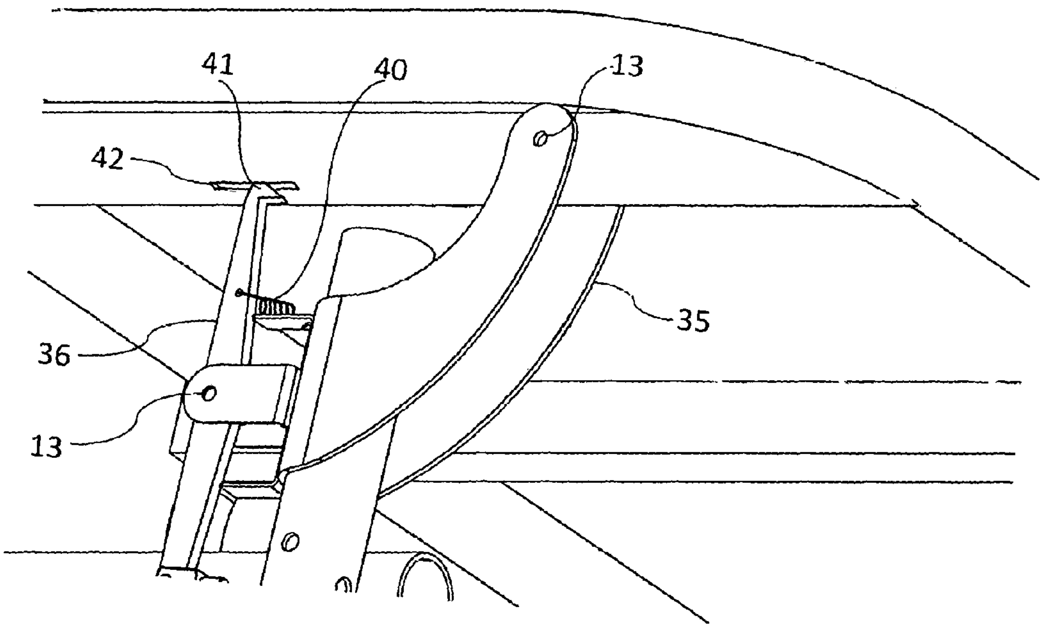
FIG. 7 is a perspective view illustrating underside of Platform showing Pivot Bracket of the Tilting Platform Assembly.

Referring to FIGS. 5, 6, & 7, the tilting assembly 16 is primarily comprised of the following components; pivot brackets 35, a platform lock 36, a release mechanism 37, and a rest rail 38. The tilting assembly 16 allows that platform 5 and hardtop 1 to rotate downward so that the footprint of the detached hardtop 1 when installed on the removal device is reduced, making it easier to move and store.

The pivot brackets 35 are a pair of semi-circular brackets. One end of each of the brackets 39 is fixedly attached to the one of the vertical platform push rods 22 and the other end is attached to the SUV top platform 17 via pinned hinge connections 13.

The platform lock 36 is a spring loaded lever that is fixedly attached to one of the pivot brackets 39 and has a spring 40 that connects and compresses the top end of the lever and the pivot bracket 35 together. The spring 40 is attached to the upper half of the lever, above the hinged connection 13. The upper tip of the lever has a hook shape 41 that inserts into a hole 42 in the SUV top platform. Once the hook shaped tip 41 is inserted into the hole in the platform hole 42, the spring 40 engages the hook 41 inside of the hollow tubing, preventing the platform 17 from rotating around the hinged connections 13 with the pivot brackets 35.

The release mechanism 37 comprises a cable 43 that is attached to the bottom part of the pawl 28 below the hinged connection 13. The other part of the cable 43 is attached to a tensioning mechanism 44 located on the SUV top platform 17. When the tensioning mechanism 44 is engaged by the operator, the cable 43 tightens and disengages the hook 41 from the hole of SUV top platform 42. Once the hook 41 has been disengaged the SUV top platform 17 can rotate around the pivot brackets 35. In the preferred embodiment of the invention the release mechanism 37 is achieved using a bicycle style brake lever, however, this could be achieved through any method known to those skilled in the art.

The rest rail 38 is a mechanical stop that prevents the platform assembly 5 and hardtop 1 from hitting the ground when it is tilted. Due to the length of an SUV hardtop 1, the device can only be tilted to a particular angle until the hardtop 1 will hit the ground potentially damaging the top 1. Depending on the make of the vehicle this angle will vary. In the preferred embodiment of the invention, the rest rail 38 is a hollow "C" shaped piece of tube that connects to bottom of each of the vertical platform push rods 22 and protrudes away from the vertical support members 23.

It should be noted that the inclusion of the tilting assembly 16 in the device is optional, and device can still perform the basic function of installing and removing a hardtop 1 without the tilting assembly 16 installed on the device. By eliminating the components of the tilting mechanism 16 and fixedly attaching the vertical push rods 22 to the SUV top platform 17 perpendicularly, the tilting assembly 17 can be simply removed from the device.

In the preferred embodiment of the device, the device is constructed of painted carbon steel, due to its strength, malleability, rust prevention, and cost. However, the inventor recognizes that the device could be constructed of any number of materials that can be formed onto the required structures and still be rigid and strong enough to support the hardtop, such as carbon fiber, plastics, PVC, and fiberglass.

Figure 12:
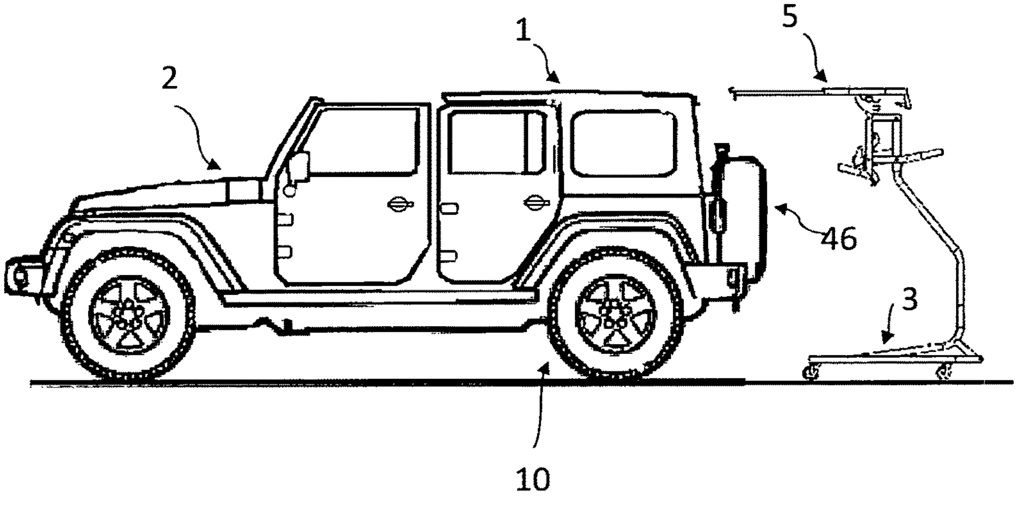
FIG. 12 is a perspective view illustrating the hardtop storage apparatus according to this invention positioned in drivers side rear quarter positioned to the outside of the vehicle illustrating view to hardtop location position.
Figure 13:
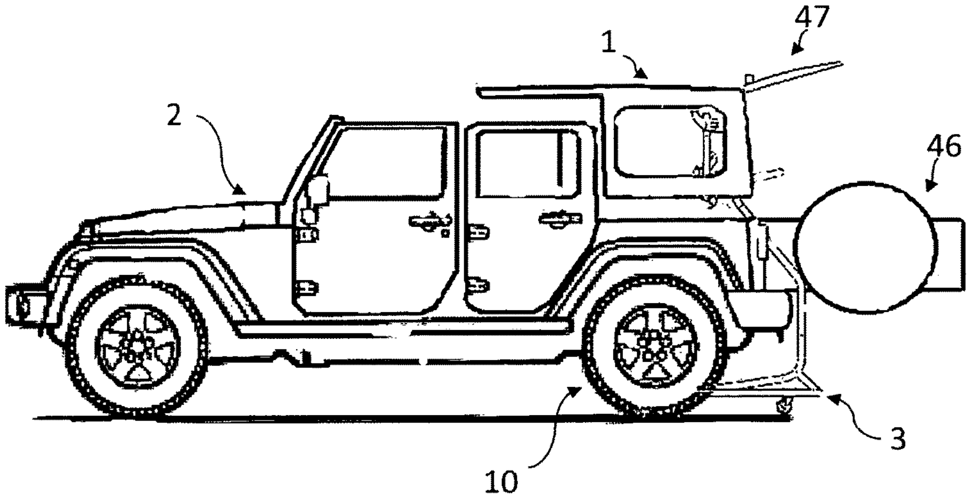
FIG. 13 illustrates the positioning to the interior of the vehicle positioned between rear wheels supporting the hardtop for removal.

Referring to FIGS. 12 & 13, when removing the hardtop 1 from a SUV 2 using this device, and operator will begin by releasing any latches affixing the hardtop 1 to the vehicle 2 and opening the rear gate 46 and glass of the hardtop 47. The operator will the lower the platform assembly 5 below the clearance level of the glass 47 for the hardtop using the release mechanism 29 for the ratcheting assembly 15. The operator will then roll the device into place, with the legs of the base 3 between the rear tires of the SUV 2, and the device in line with the SUV 2.

Once the device is in place, the operator will exert a downward force on the lift lever 21, which will raise the platform assembly 5 until it engages with the hardtop 1. The operator will continue to exert a downward force on the lift lever 21, de-coupling the hardtop 1 and the SUV 2, and will continue to exert this force until the hardtop 1 is clear of the vehicle 2. Once the operator ceases to exert the downward force, the ratcheting assembly 15 will maintain the elevated position of the hardtop.

Figure 14:
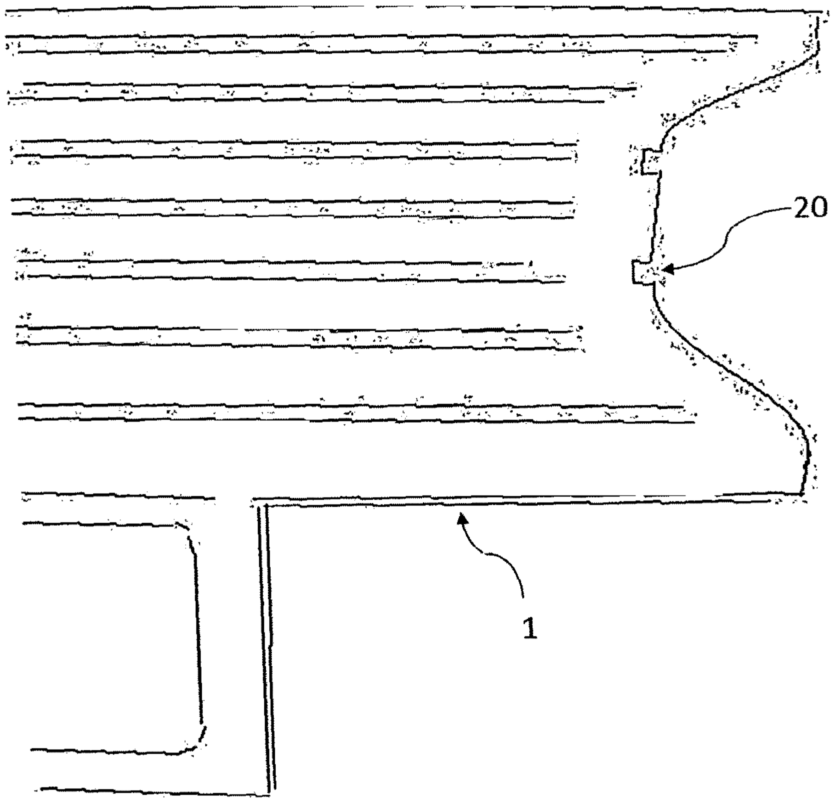
FIG. 14 is a view illustrates the positioning for the Grip Rail Fingers for supporting the hardtop for removal.

Referring to FIGS. 10 & 14, once the hardtop 1 is clear of the vehicle 2, the operator will now install the grip rails 18 from the front of the hardtop 1 into the rail sleeves and engaging the push button clip locking mechanism so that the finger grips 19 engage with the notches in the hard top 20. This will secure the hardtop 1 by means of the finger grips 19. The operator can now roll the entire apparatus with hardtop 1 securely mounted away from the vehicle 2 so the legs of the base unit 3 clear the wheels and are to move about. The operator can now lower the platform assembly 5 with hardtop 1 in place from a horizontal elevated position by disengaging the ratcheting mechanism 24 using the release mechanism 29, whereby lowering the top to the desired height.

Referring to FIG. 11, once the operator has lowered the hardtop 1 from an elevated position, the device can be tilted for ease of storage. The operator can engage the tilt assembly 16 by engaging the release mechanism 37 for the tilt assembly 16. Once the release mechanism 37 has been engaged the platform assembly 5 and hardtop 1 will rotate around the pivot brackets 35 to the rest position against the rail rest 38 for easy storage. The operator can now roll or maneuver the entire apparatus with hardtop 1 securely mounted in place by means of casters 7 mounted to the base 3 to anywhere you are able to do so with ease or minimal effort.

Figure 15:
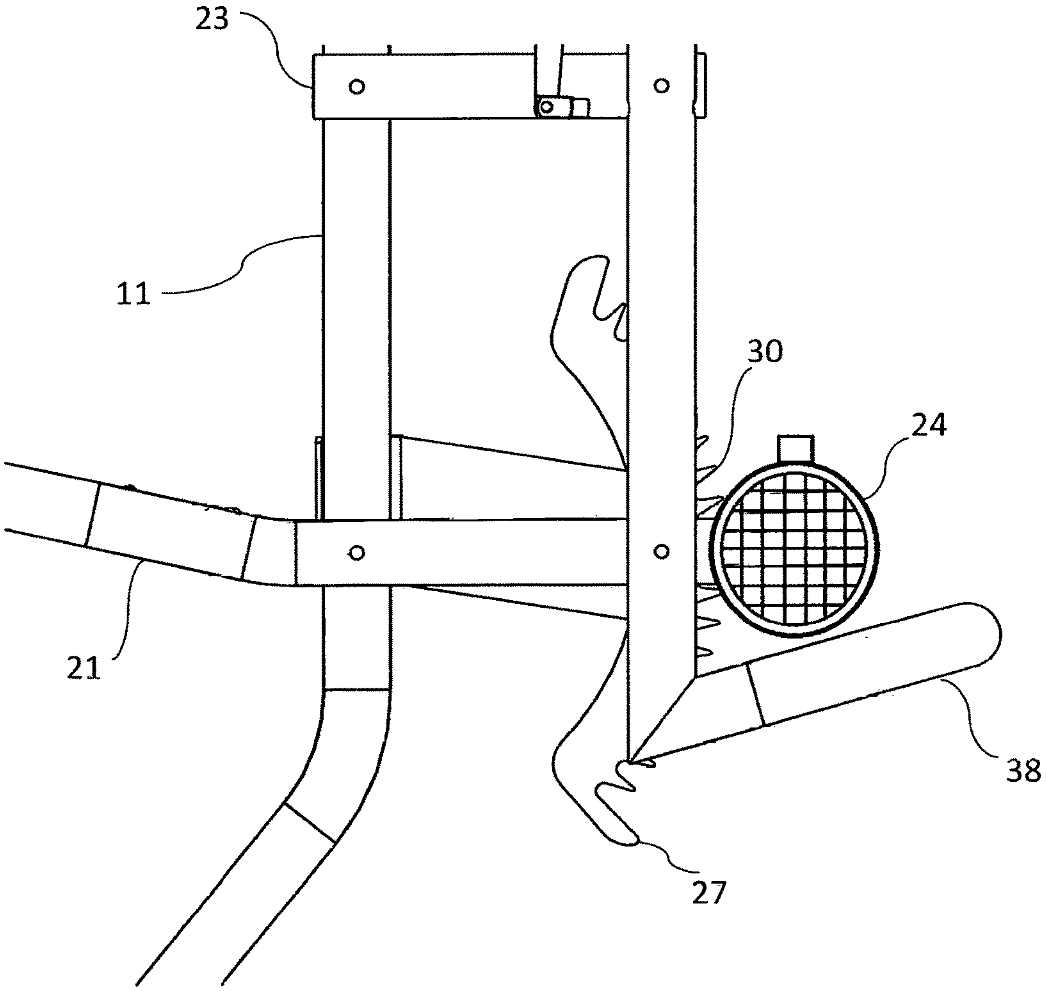
FIG. 15 is a left side view illustrating an alternate embodiment of the invention where the ratcheting lift assembly is replaced by an electric gear motor.

Referring to FIG. 15, in an alternate embodiment of the invention, the ratcheting lift assembly is replaced by an electric gear motor. This alternate embodiment is primarily comprised of the following components; a lift lever 21, vertical platform push rods 22, horizontal lift support members 23, lift gear 27, and a gear motor 24. In this embodiment of the device, the gear motor is mounted on the to the vertical platform push rods 22 in a manner such that the teeth of the gear motor (not pictured) engage the teeth 30 of the lift gear 27. The gear motor is electrically powered and can rotate its gear clockwise and counter clockwise, and is equipped with an internal brake which will prevent unwanted movement of platform assembly 5 upwards or downwards. When the operator operates the gear motor in the counterclockwise direction the platform assembly 5 will move upwards, and when the operator operates the gear motor in the clockwise direction the platform assembly 5 will move in the downwards direction.

While the description above describes a device designed for the removal of SUV convertible tops, as there is currently a demand for this type of device, the described device with minor modifications known to those skilled in the art could also be used for removing different types of vehicle tops, such as removable hardtops for cars, and caps for truck beds.

It would be appreciated by those skilled in the art that various changes and modifications can be made to the illustrated embodiments without departing from the spirit of the present invention. All such modifications and changes are intended to be covered by the appended claims.

What is claimed is:

1. An apparatus for removing, storing, and installing removable hardtop devices from automobiles comprising:

- a movable base unit which is sufficiently long and wide to support the apparatus from longitudinal and axial moments with and without the hardtop Installed;
- a vertical support structure having a lower and upper ends, wherein said lower end is affixed to said movable base and said upper end is attached to a means for vertical lifting;
- a means for vertical lifting which is connected to said vertical support structure and allows the apparatus to exert force vertically for removing the hardtop from the automobile, sustaining the hardtop at a fixed height once the hardtop has been removed from the automobile, and allowing the hardtop to be controllably lowered onto the automobile during installation;
- a platform structure attached to said vertical lifting means which interfaces with the hardtop to distribute lifting forces evenly throughout the hardtop and is capable of securing and supporting the hardtop longitudinally and axially while the hardtop is installed on the apparatus;
- wherein the apparatus may be positioned to the hardtop while is installed on the automobile and selectively raised or lowered by said vertical lifting means.

2. The apparatus of claim 1, wherein said vertical lifting means comprises:

- a lift lever allowing an operator to forcibly control the upward and downward movement of said platform around a hinged connection to said vertical support structure;
- one or more vertical platform push rods, each having an lower and upper end, wherein said lower end is affixed to said lift lever and said upper end is attached to said platform;
- a semi-circular gear with teeth affixed to either the vertical support structure or a vertical platform push rod;
- a pawl attached to either the vertical support structure or a vertical platform push rod, whichever one said gear Is not attached to, incorporating a spring loading mechanism which engages the pawl into the teeth of said gear, preventing downward movement of said platform when said pawl is engaged with said gear;
- a means for a release mechanism which will disengage said pawl from said gear teeth, allowing downward movement of said platform when said pawl is disengaged with said gear teeth.

3. The apparatus of claim 2, wherein said platform structure comprises:

- an upper platform section constructed of hollow tube having a topside and underside which upon the topside the hardtop will rest;
- one or more hollow grip rail tubes affixed to the underside of said upper platform section with inner cross sectional segments slightly larger than the representative profile of the cross-section of the outer surface of the grip rail which is inserted into it;
- one or more long tube members which are slideable into said hollow grip rail tubes where the outer cross sectional segments of the tube members provides a smaller larger representative profile of the cross-section of the inner surface of the grip rail sleeve which it is inserted into;
- a means for securing the long tube members to the hollow grip rail tubes once the long tube members have been inserted into the hollow grip rail;
- a means for securing said long tube members to the hardtop.

4. The apparatus of claim 3, wherein said apparatus further incorporates a tilting mechanism comprising:

- one or more hinged connections between the said platform and said vertical platform push rods;
- a means for a locking mechanism which when engaged will prevent the rotation of the platform said platform to rotate around said vertical platform push rods;
- a means for a release mechanism which will disengage said locking mechanism, allowing said platform to rotate around said vertical platform push rods.

5. The apparatus of claim 1, wherein said vertical lifting means comprises:

- a motor which allows the operator to control the upward and downward movement of said platform around a hinged connection to said vertical support structure;
- one or more vertical platform push rods, each having an lower and upper end, wherein said lower end is affixed to said lift lever and said upper end is attached to said platform;
- a semi-circular gear affixed to either the vertical support structure or the vertical platform push rods;
- a gear mounted to the end of the motor which meshes with said semi-circular gear which when rotated drives said vertical platform push rods in the upward or downward direction.

6. The apparatus of claim 5, wherein said platform structure comprises:

- an upper platform section constructed of hollow tube having a topside and underside which upon the topside the hardtop will rest;

one or more hollow grip rail tubes affixed to the underside of said upper platform section with inner cross sectional segments slightly larger than the representative profile of the cross-section of the outer surface of the grip rail which is inserted into it;

one or more long tube members which are slideable into said hollow grip rail tubes where the outer cross sectional segments of the tube members provides a smaller larger representative profile of the cross-section of the inner surface of the grip rail sleeve which it is inserted into;

a means for securing the long tube members to the hollow grip rail tubes once the long tube members have been inserted into the hollow grip rail;

a means for securing said long tube members to the hardtop.

7. The apparatus of claim 6, wherein the apparatus further incorporates a tilting mechanism comprising:

one or more hinged connections between the said platform and said vertical platform push rods;

a locking mechanism which when engaged will prevent the rotation of the platform said platform to rotate around said vertical platform push rods;

a release mechanism which will disengage said locking mechanism, allowing said platform to rotate around said vertical platform push rods.

* * * * *